(12) United States Patent
Minoli et al.

(10) Patent No.: US 9,914,329 B2
(45) Date of Patent: Mar. 13, 2018

(54) TYRE FOR HEAVY LOAD VEHICLE WHEELS

(75) Inventors: Claudio Minoli, Milan (IT); Tommaso Pizzorno, Milan (IT); Alessandro Ascanelli, Milan (IT)

(73) Assignee: PIRELLI TYRE S.P.A., Milan (IT)

( * ) Notice: Subject to any disclaimer, the term of this patent is extended or adjusted under 35 U.S.C. 154(b) by 741 days.

(21) Appl. No.: 13/993,737

(22) PCT Filed: Dec. 19, 2011

(86) PCT No.: PCT/IB2011/003072
§ 371 (c)(1),
(2), (4) Date: Jun. 13, 2013

(87) PCT Pub. No.: WO2012/085639
PCT Pub. Date: Jun. 28, 2012

(65) Prior Publication Data
US 2013/0263988 A1 Oct. 10, 2013

Related U.S. Application Data

(60) Provisional application No. 61/466,669, filed on Mar. 23, 2011.

(30) Foreign Application Priority Data

Dec. 23, 2010 (IT) .............................. RM2010A0689

(51) Int. Cl.
*B60C 11/11* (2006.01)
*B60C 11/13* (2006.01)
*B60C 11/03* (2006.01)

(52) U.S. Cl.
CPC ...... *B60C 11/1353* (2013.01); *B60C 11/0316* (2013.01); *B60C 11/11* (2013.01);
(Continued)

(58) Field of Classification Search
CPC ......... B60C 11/1353; B60C 2011/0334; B60C 11/13; B60C 2011/1361
See application file for complete search history.

(56) References Cited

U.S. PATENT DOCUMENTS

| | | | | |
|---|---|---|---|---|
| 5,198,047 A | * | 3/1993 | Graas ................. | B60C 11/0302 152/209.18 |
| 5,896,905 A | | 4/1999 | Lurois | |

(Continued)

FOREIGN PATENT DOCUMENTS

| | | |
|---|---|---|
| GB | 903389 A * | 8/1962 |
| JP | 03-132403 A * | 6/1991 |

(Continued)

OTHER PUBLICATIONS

Machine translation for Korea 754,351 (no date).*

(Continued)

*Primary Examiner* — Steven D Maki
(74) *Attorney, Agent, or Firm* — Finnegan, Henderson, Farabow, Garrett & Dunner, L.L.P.

(57) ABSTRACT

A tire includes a tread provided with blocks formed among substantially longitudinal and transverse grooves, wherein among the blocks particularly broad intersections are formed, for example, by staggering substantially transverse grooves of circumferential rows axially in side-by-side relationship, of blocks with rounded corners, and wherein, inside such broad intersections, a stocky-shaped protrusion is arranged which has a lateral stiffness greater than the lateral stiffness of the surrounding blocks.

13 Claims, 4 Drawing Sheets

(52) U.S. Cl.
CPC ....... *B60C 11/13* (2013.01); *B60C 2011/0334* (2013.01); *B60C 2011/1361* (2013.01)

(56) References Cited

U.S. PATENT DOCUMENTS

| | | | | |
|---|---|---|---|---|
| 5,975,172 | A | * | 11/1999 | Nakatsuji ............ B60C 11/0306 152/209.19 |
| 6,000,451 | A | * | 12/1999 | Takada .................... B60C 11/11 152/209.19 |
| 6,176,284 | B1 | | 1/2001 | Takada |
| 2001/0032691 | A1 | * | 10/2001 | Ohsawa .................. B60C 11/13 152/209.18 |
| 2009/0101260 | A1 | * | 4/2009 | Ikegami ............. B60C 11/0306 152/209.18 |
| 2011/0088821 | A1 | * | 4/2011 | Imakita ............... B60C 11/0302 152/209.15 |

FOREIGN PATENT DOCUMENTS

| | | | |
|---|---|---|---|
| JP | 2005-035370 A | * | 2/2005 |
| KR | 754351 B1 | * | 8/2007 |
| WO | WO 01/39994 A1 | | 6/2001 |
| WO | WO 2008/064703 A1 | | 6/2008 |

OTHER PUBLICATIONS

Machine translation for Japan 03-132403 (no date).*
Machine translation for Japan 2005-035370 (no date).*
International Search Report from the European Patent Office for International Application No. PCT/IB2011/003072, dated May 2, 2012.
Written Opinion of the International Searching Authority from the European Patent Office for International Application PCT/IB2011/003072, dated May 2, 2012.

* cited by examiner

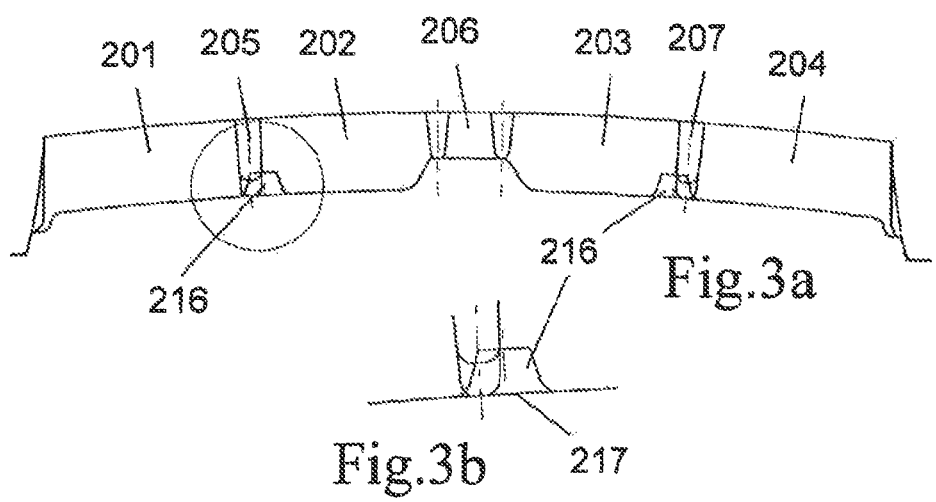
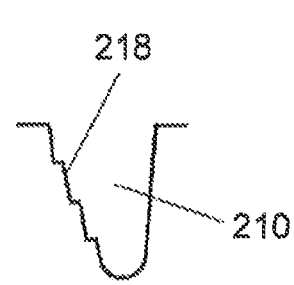

TYRE FOR HEAVY LOAD VEHICLE WHEELS

CROSS REFERENCE TO RELATED APPLICATIONS

This application is a national phase application based on PCT/IB2011/003072, filed Dec. 19, 2011, which claims the priority of Italian Application No. RM2010A000689, filed Dec. 23, 2010, and the benefit of U.S. Provisional Application No. 61/466,669, filed Mar. 23. 2011, the content of each application being incorporated herein by reference.

FIELD OF THE INVENTION

The present invention relates to a tyre for vehicle wheels, particularly for heavy load vehicle wheels. Even more particularly, the present invention relates to tyres for wheels of heavy load vehicles intended for a so-called "on-off" use, i.e. vehicles used both on normal road paths and on off-road paths, typically on dirt roads, in quarries or building yards.

STATE OF THE ART

The following documents describe some tyres for heavy load vehicle wheels: WO 01/39994, WO 2008/064703, U.S. Pat. No. 5,896,905, U.S. Pat. No. 6,176,284.

SUMMARY OF THE INVENTION

The tyres for wheels of heavy load vehicles which alternate distances covered on asphalted roads with stretches of non-asphalted or building yard roads have to face, particularly during the winter or spring season, a problem of low traction because of the filling of the tread grooves with mud which gets trapped therein while running on off-road paths.

In treads with very wide grooves the problem of mud trapping practically does not arise. However, such tyres are used mainly for off-road purposes.

Tyres for heavy load vehicles used mainly on asphalted roads and only minimally on off-road paths (for example, quarry-building yard vehicles, such as concrete mixers or dumpers), however, typically have narrower grooves, for not penalizing too much the performances in terms of comfort (both acoustic and vibrational) and life duration (wear) when running on asphalted grounds.

In this kind of tyres the trapping of mud is a problem, since the mud not expelled gets compacted in the tread grooves, revolution after revolution, worsening the traction features of the tyre, because of the substantial loss of the pressure conditions which are generated at the block ends and allow the grip on the rolling surface to be maximised.

Moreover the trapped and compacted mud fills the entire intersection and part of the surrounding grooves with an extremely thick material, until the tread becomes substantially smooth, which can cause serious problems when running on a wet and/or slippery ground.

The Applicant has faced the problem of providing a tread for a tyre for heavy load vehicle wheels intended for use both on common (asphalted) road paths and on off-road paths, capable of providing said tyre with good performances in terms of traction, comfort and noise level on an asphalted ground, and, at the same time, to effectively expel pieces of mud which get trapped in the grooves when passing on muddy grounds, so as to maintain substantially unchanged the traction features on muddy grounds and the safety features when running on a wet and/or slippery ground.

The Applicant has found that such a problem can be solved by means of a tread provided with blocks formed among substantially longitudinal and transverse grooves, wherein particularly broad intersections are formed among the blocks, for example by staggering substantially transverse grooves of circumferential rows, axially in side-by-side relationship, of blocks with rounded corners, and wherein inside such broad intersections a stocky-shaped protrusion is arranged, having a lateral stiffness greater than the lateral stiffness of the surrounding blocks.

Here and in the remainder of the description, by "lateral stiffness" it is meant a force per unit displacement required for the blocks or the protrusion to move in a generic direction laying on plane perpendicular to a radial direction of the tyre (for example a circumferential or axial direction), typically on the plane of the radially outer surface of the tread band.

Lower mobility corresponds to a higher lateral stiffness, and vice versa.

The Applicant has surprisingly found that the above-mentioned broad intersections do not cause any substantial increase of the noise level and/or of the vibrations generated by the tyre when rolling on an asphalted ground, and advantageously provide the tyre with a series of grip fronts when running a muddy ground.

The stocky-shaped protrusion allows the respective broad intersection to be freed from mud which gets trapped on passing in a footprint area because of the sucking effect caused by movements of mutual approach of walls of the blocks. In particular, when leaving the footprint area, the stocky and rigid protrusion—under the action of the underlying belt structure—gives rise to a thrust in the radial direction on possibly trapped mud, so as to effectively expel the same.

Moreover the different lateral stiffness of the protrusion and of the surrounding blocks causes a relative movement between the mobile walls of the surrounding blocks and the substantially fixed protrusion, which movement hinders the compaction of mud, which possibly gets trapped in the broad intersection on passing in the footprint area, by causing fissuring, cracking and/or tearing of the trapped mud itself. The expulsion of trapped mud itself when leaving the footprint area is thus promoted.

The tread of the tyre thus remains substantially always clean from trapped mud, so as to maintain its traction features substantially the same on all the grounds on which it runs.

In a first aspect thereof, the invention relates to a method for promoting the traction of a tyre on a muddy surface, wherein the tyre-comprises a tread band, and the tread band comprises a plurality of blocks formed among a plurality of substantially transverse grooves and a plurality of substantially longitudinal grooves. The substantially transverse and substantially longitudinal grooves form a plurality of intersections among said blocks.

The method comprises forming at least one broad intersection comprising a respective portion of a radially inner surface of the tread band having a significant dimension. The broad intersection is such as to allow an ellipse to be inscribed therein, said ellipse having axes longer than a width both of the substantially transverse grooves and of the substantially longitudinal grooves forming the broad intersection. In particular, at least one of the axes of the inscribable ellipse has a length equal to at least 1.5 times the width both of the substantially transverse grooves and of the substantially longitudinal grooves forming the broad intersection.

The method further comprises arranging—in said broad intersection—a stocky-shaped protrusion, projecting from the radially inner surface of said tread band. The protrusion has a volume smaller than the volume of the blocks surrounding the broad intersection and is such as to provide said protrusion with a lateral stiffness greater than a lateral stiffness of the surrounding blocks.

When the tyre is set in rolling condition on a muddy surface, a piece of mud is trapped within the broad intersection while the broad intersection passes in the footprint area, by means of a first movement of mutual approach of the blocks surrounding the broad intersection.

The expulsion of such a piece of mud from the broad intersection after the broad intersection has left the footprint area is promoted by means of a second movement of mutual separation of the blocks surrounding the broad intersection, in combination with a thrust in radial direction caused by the protrusion arranged in the broad intersection.

According to a second aspect thereof, the invention relates to a tyre comprising a tread band, wherein said tread band comprises a plurality of blocks formed among a plurality of substantially transverse grooves and a plurality of substantially longitudinal grooves. The substantially transverse and substantially longitudinal grooves further form a plurality of intersections among said blocks.

The plurality of intersections formed among the blocks comprises broad intersections. Each broad intersection comprises a respective portion of a radially inner surface of the tread band having a significant dimension and being such as to allow an ellipse to be inscribed therein, said ellipse having axes longer than the width both of said substantially transverse grooves and of said substantially longitudinal grooves forming the broad intersection. At least one of the axes of said ellipse inscribable in the broad intersection has a length equal to at least 1.5 times the width both of the substantially transverse grooves and of the substantially longitudinal grooves forming the broad intersection.

In each broad intersection a stocky-shaped protrusion is arranged, projecting from the portion of the radially inner surface of the tread band. The stocky shape, i.e. a shape with a width greater than the height, of the protrusion increases the lateral stiffness thereof.

The protrusion further has a volume smaller than the volume of the blocks surrounding the broad intersection and such as to provide said protrusion with a lateral stiffness greater than the lateral stiffness of the blocks surrounding the broad intersection.

The protrusion thus forms a solid and stable piece, without thin portions which would increase the overall mobility thereof.

Preferably, the blocks may be arranged—in the tread band—according to a plurality of circumferential rows axially in side-by-side relationship.

Preferably, the broad intersections are formed between at least one pair of adjacent circumferential rows of blocks, comprising transverse grooves staggered in the transverse direction.

Even more preferably, the broad intersections are formed between at least two pairs of adjacent circumferential rows of blocks. Each pair of circumferential rows may comprise transverse grooves staggered in the transverse direction.

For example, the broad intersections may be formed between two axially outer pairs of circumferential rows of blocks of the tread band.

In an embodiment, the tyre comprises at least four circumferential rows of blocks, axially in side-by-side relationship. Said at least four circumferential rows of blocks may preferably divide the width of the tread band in respective at least four portions with substantially the same width. By "width of the tread band" it is meant the distance between the axially outer edges of the radially outer profile of the tread band.

The Applicant has observed that this arrangement advantageously allows the contact pressures between tyre and rolling surface in the footprint area to be equalized.

The protrusion arranged in the broad intersections projects from the radially inner surface of the tread band by a height preferably smaller than the depth of the respective broad intersection. For example, such height may be between 25% and 75% of the depth of the respective broad intersection. The height of the protrusion smaller than the depth of the broad intersection increases the lateral stiffness of the protrusion itself, which does not come into contact with the ground when passing in the footprint area, so as to remain stably bound to the belt structure underlying the tread band.

The base surface of said protrusion preferably has a size at least equal to 40% of the length of the minor axis of the ellipse inscribable in the respective broad intersection. This allows occupying a major part of the portion of the radially inner surface of the tread band comprised in the broad intersection by means of the protrusion, as well as forming an extremely stable protrusion.

In a preferred embodiment, the shape of said protrusion is frustoconical.

Preferably, the profile of the base surface of said protrusion is spaced apart from the walls of the blocks surrounding the respective broad intersection. This solution makes the walls of the blocks surrounding the broad intersection independent from the protrusion, thus promoting the relative motion between the walls of the blocks and the protrusion, for hindering the compaction of possible mud trapped in the broad intersection itself.

Preferably, at least the blocks surrounding said broad intersection comprise an inclined leading wall. Such an inclined leading wall may comprise at least one step, more preferably a plurality of steps. Here and in the remainder of the description, by "leading wall" of a block it is meant the wall of the block intended to first enter in the footprint area. Furthermore, by "inclined wall" it is meant a wall having a radially outermost corner not radially aligned with the corresponding corner (or joining surface) at the radially inner surface of the tread band. Such an inclined wall does not necessarily have a smooth surface, and, as mentioned above, may have steps. The presence of steps in the walls of the blocks surrounding the broad intersections may further promote the expulsion of mud trapped in the broad intersections and possibly in the surrounding grooves.

Preferably, in the tyre according to the invention the ratio between the overall surface area taken by the blocks and the overall surface area of the tread band is at least equal to 60%. Typically, this ratio is lower than 80%.

Preferably, the longitudinal and/or transverse grooves surrounding said broad intersections have a width not greater than about 25 mm at the radially outer surface of the tread band. Preferably, the longitudinal and/or transverse grooves surrounding said broad intersections have a width not smaller than about 6 mm at the radially outer surface of the tread band.

The following definitions further apply in the present description.

By "equatorial plane" of the tyre it is meant a plane perpendicular to the rotation axis of the tyre and dividing the tyre into two symmetrically equal portions.

By "circumferential" or "longitudinal" direction of the tyre it is meant a direction generically directed according to the rotation direction of the tyre, or in any case only slightly inclined with respect to the rotation direction of the tyre (typically with an angle smaller than 45° with respect to the rotation direction of the tyre).

By "axial" direction it is meant a direction parallel to the rotation axis of the tyre.

By "transverse" direction it is meant a direction generically directed according to an axial direction, or in any case according to a direction only slightly inclined with respect to the axial direction (typically with an angle smaller than 45° with respect to the axial direction).

Moreover, any value relating to angles formed by the longitudinal and/or transverse grooves with respect to predetermined direction is always to be intended as an absolute vale.

BRIEF DESCRIPTION OF THE FIGURES

Further features and advantages of the invention shall now be presented with reference to embodiments shown as non-limiting examples in the accompanying figures, wherein:

FIG. 3a is an enlarged sectional view of the tyre tread portion shown in FIG. 2. The section is taken along the line a-a shown in FIG. 2.

FIG. 3b is an enlarged sectional view of a detail of the section of FIG. 3a.

FIG. 4 is an enlarged sectional view of a groove of the tread of the tyre of FIGS. 1-2. The section is taken along the line b-b shown in FIG. 2.

DETAILED DESCRIPTION OF EMBODIMENTS OF THE INVENTION

Figure 1:
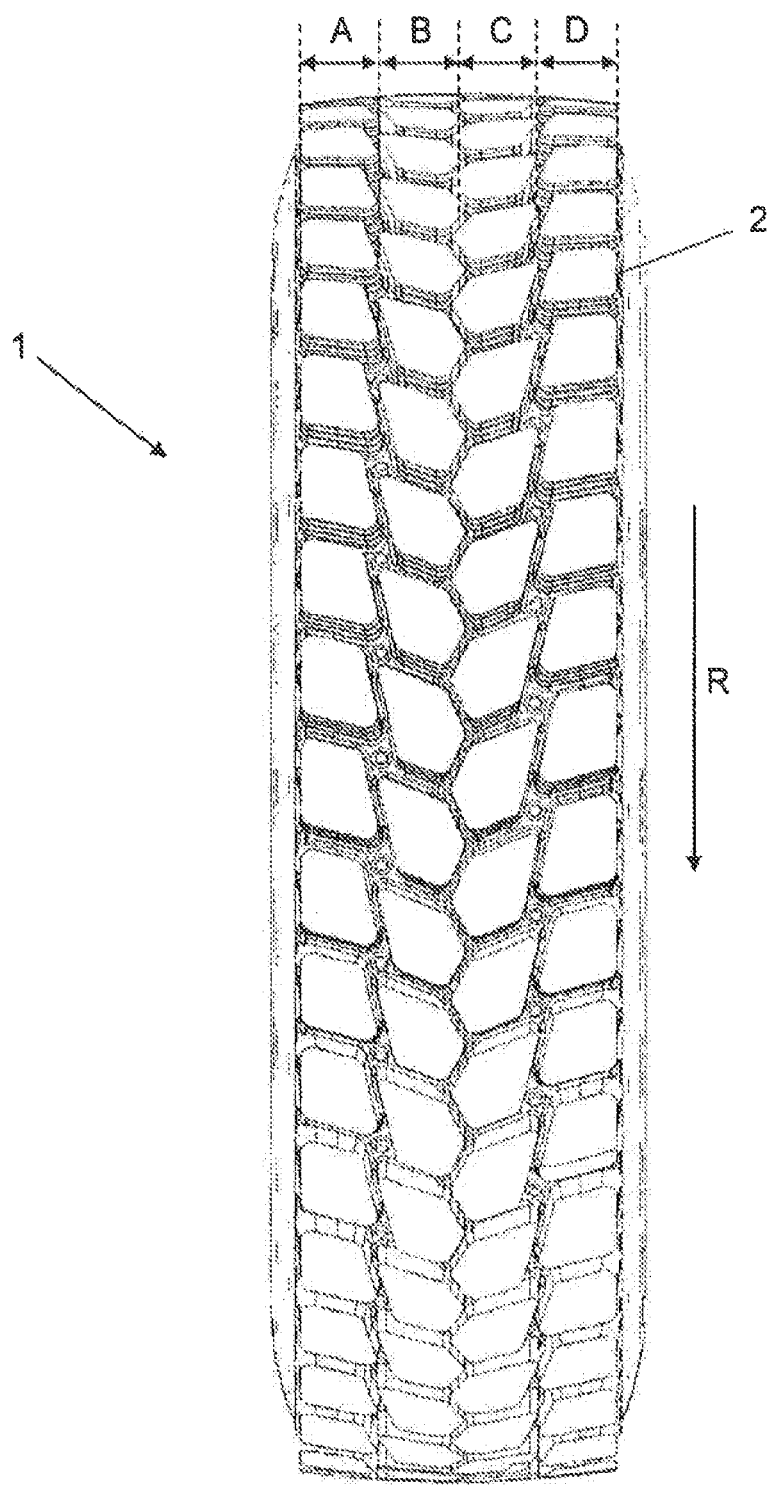
FIG. 1 is a plan view of a tyre having a tread made according to an example of the invention.

In FIG. 1 a tyre for vehicle wheels according to the present invention, particularly a tyke for heavy load vehicle wheels, is generally indicated at 1. In particular, the tyre 1 is adapted to be mounted on the traction axle of the heavy load vehicle. However, it is not excluded that it can be mounted also on the steering axle of the vehicle. The tyre 1 comprises a tread band 2.

The tread band 2 comprises a plurality of blocks formed among a plurality of substantially transverse grooves and a plurality of substantially longitudinal grooves. The blocks are arranged according to a plurality of circumferential rows axially in side-by-side relationship.

Preferably, the tread band 2 has a ratio between the overall surface area taken by the blocks and the overall surface area of the tread band at least equal to 60%. Typically, such a ratio is lower than 80%. In the example shown in FIG. 1, such a ratio is equal to about 69%.

The blocks of the tread band 2 have a substantially polygonal shape (leaving out usual rounding off of corners), preferably a convex polygon shape. Preferably, such polygons comprise four to eight sides.

In the embodiment shown in FIG. 1, the tyre comprises four circumferential rows A, B, C, D of blocks, axially in side-by-side relationship. The four circumferential rows of blocks divide the width of the tread band in respective four portions with substantially the same width. In other words, the blocks belonging to circumferential grooves A, B, C, D have a same maximum width in the axial direction. This may correspond, for example, to a difference between the smallest and greatest maximum width in the axial direction of the blocks of the circumferential rows A, B, C, D which is smaller than 10-20% of the greatest maximum width of the block themselves.

In the embodiment shown in FIG. 1, the circumferential rows A, B, C, D of blocks are separated from one another by substantially longitudinal grooves with a zig-zagging course.

In each circumferential row A, B, C, D, the blocks are separated from one another by substantially transverse grooves. Such substantially transverse grooves may preferably be inclined with respect to the axial direction.

The tread 2 is preferably of the directional type, i.e. it has a preferred rolling direction, indicated by R.

As better shown hereinafter with reference to FIG. 2, the intersections between substantially longitudinal and substantially transverse grooves comprise particularly broad intersections, in which protrusions are arranged. In the embodiment shown in FIG. 1, such broad intersections and such protrusions can be seen between the pairs A-B and C-D of circumferential rows of blocks.

Figure 5:
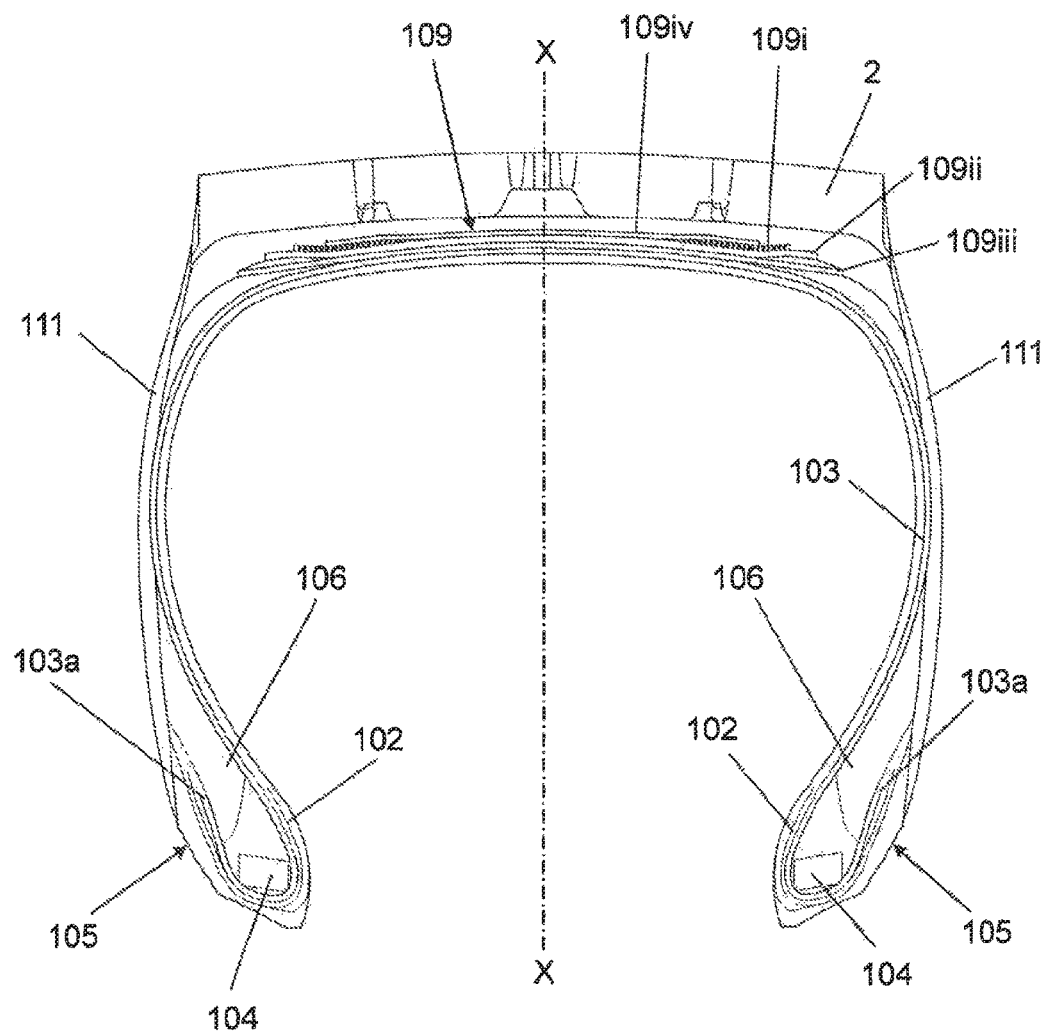
FIG. 5 is a sectional view of the tyre of FIG. 1.

As better shown in FIG. 5, the tyre 1 comprises a carcass structure, including at least one carcass ply 103, formed by reinforcing cords, typically made of metal, incorporated into an elastomeric matrix.

The carcass ply 103 has opposite end edges 103a engaged with respective bead cores 104. The latter are arranged in regions 105 of the tyre 1 usually called "beads".

An elastomeric filler 106 (divided into two radially superimposed portions in the embodiment shown in FIG. 5) taking up the space defined between the carcass ply 103 and the respective end edge 103a of the carcass ply 103 is applied onto the radially outer perimeter edge of the bead cores 104. The bead cores 104 hold the tyre 1 firmly fixed to an anchoring seat provided for this purpose in the wheel rim, thus preventing the bead 105 from coming out from such a seat during operation.

At the beads 105 specific reinforcing structures (such as for example the flipper 102) may be provided, which have different functions, such as for example the improvement of torque transmission to the tyre 1.

In a radially outer position with respect to the carcass structure 102 a belt structure 109 is applied, which preferably comprises several belt layers (four layers 109$i$, 109$ii$, 109$iii$, 109$iv$ are represented in the specific example shown) arranged radially one on top of the other and having reinforcing cords, typically made of metal, with a crossed orientation and/or substantially parallel with respect to the direction of circumferential development of the tyre 1. In the belt structure 109 of the tyre shown in FIG. 5, layers 109$ii$, 109$iii$ and 109$iv$ comprise reinforcing cords oriented obliquely with respect to the equatorial plane X-X of the tyre, whereas layer 109$i$ comprises reinforcing cords oriented substantially in the circumferential direction (typically with an angle smaller than 5-6° with respect to a direction parallel to the equatorial plane X-X).

A tread band 2, made as well of an elastomeric material, is applied in a radially outer position with respect to the belt structure 109.

On the lateral surfaces of the carcass structure 102 respective sidewalls 111 made of an elastomeric material are further applied, each extending from one of the opposite lateral edges of the tread band 2 up to the beads 105.

Figure 2:
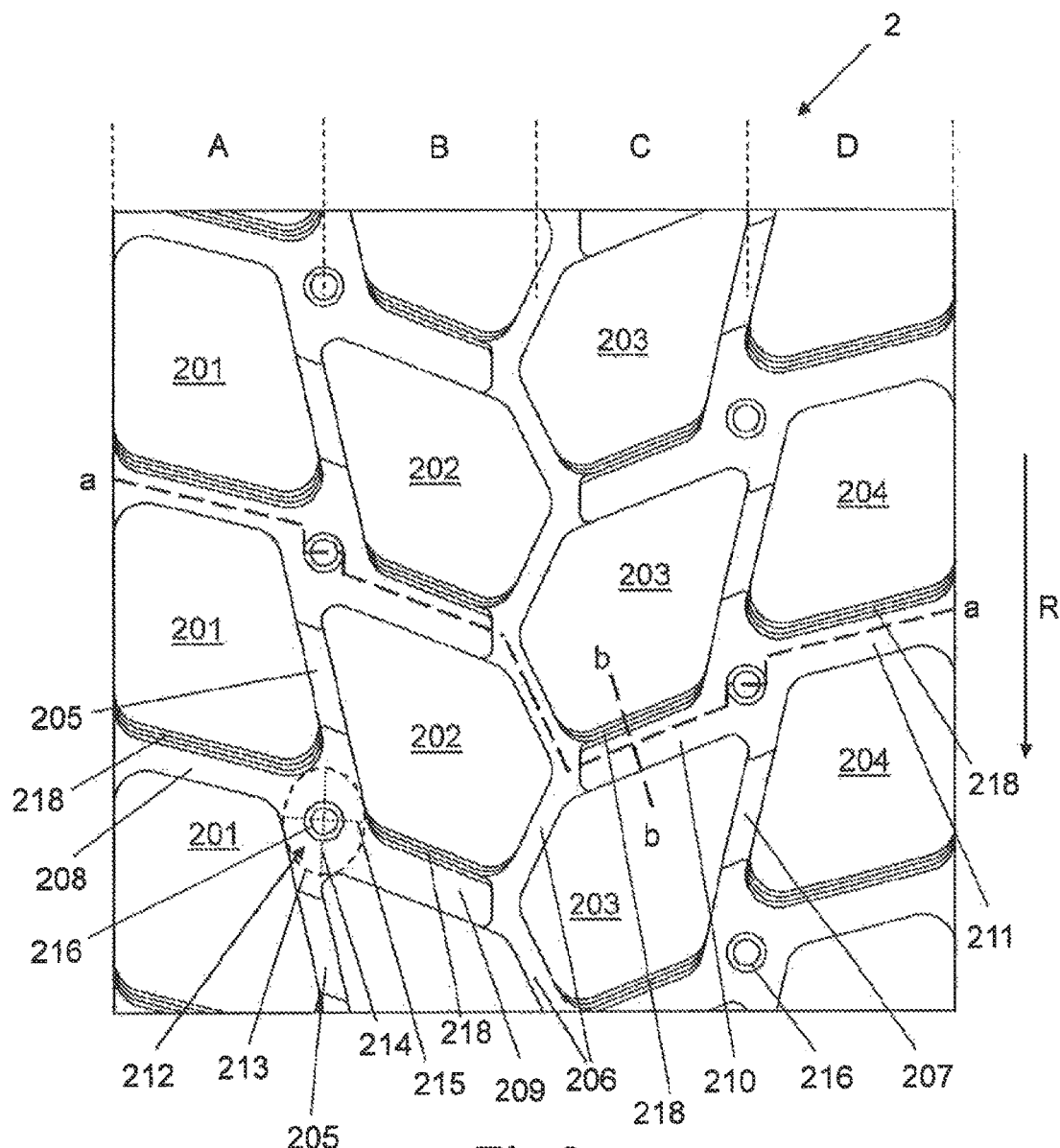
FIG. 2 is a view of a portion of the tread of the tyre of FIG. 1.

FIG. 2 shows in greater detail a portion of the tread 2 of the tyre of FIG. 1. FIG. 3*a* shows a section of the tread 2 along the dashed line indicated by a-a in FIG. 2.

Referring to FIG. 2 and FIG. 3*a*, the tread band 2 comprises a plurality of blocks 201, 202, 203, 204.

The blocks 201 and 204 are arranged according to respective circumferential rows A and D located at the axially outermost regions of the tread band 2.

The blocks 202 and 203 are arranged according to respective circumferential rows B and C, in an axially inner position with respect to the circumferential rows A and D.

The blocks 201, 202, 203, 204 are formed among a plurality of substantially transverse grooves 208, 209, 210, 211 and a plurality of substantially longitudinal grooves 205, 206, 207.

The substantially transverse grooves 208 circumferentially separate from one another the blocks 201 of the axially outer circumferential row A. Preferably, the transverse grooves 208 are slightly inclined with respect to the axial direction. For example, they may form an angle between 0° and 30°, preferably between 0° and 25° with respect to the axial direction. In the example shown in FIG. 2, the grooves 208 form an angle of about 14° with respect to the axial direction.

The substantially transverse grooves 209 circumferentially separate from one another the blocks 202 of the axially inner circumferential row B. Preferably, the transverse grooves 209 are slightly inclined with respect to the axial direction. For example, they may form an angle between 0° and 40°, preferably between 0° and 35° with respect to the axial direction. In the example shown in FIG. 2, the grooves 209 form an angle of about 21° with respect to the axial direction.

Preferably, the angle formed by the substantially transverse grooves 209 of the axially inner circumferential row B of blocks with respect to the axial direction is greater than the angle formed by the substantially transverse grooves 208 of the axially outer circumferential row A of blocks with respect to the axial direction.

The substantially transverse grooves 210 circumferentially separate from one another the blocks 203 of the axially inner circumferential row C. Preferably, the transverse grooves 210 are slightly inclined with respect to the axial direction. For example, they may form an angle between 0° and 40°, preferably between 0° and 35° with respect to the axial direction. In the example shown in FIG. 2, the grooves 210 form an angle of about 21° with respect to the axial direction.

The substantially transverse grooves 211 circumferentially separate from one another the blocks 204 of the axially outer circumferential row D. Preferably, the transverse grooves 211 are slightly inclined with respect to the axial direction. For example, they may form an angle between 0° and 30°, preferably between 0° and 25° with respect to the axial direction. In the example shown in FIG. 2, the grooves 211 form an angle of about 14° with respect to the axial direction.

Preferably, the angle formed by the substantially transverse grooves 210 of the axially inner circumferential row C of blocks with respect to the axial direction is greater than the angle formed by the substantially transverse grooves 211 of the axially outer circumferential row D of blocks with respect to the axial direction.

Preferably, the substantially transverse grooves 208, 209, 210, 211 have a width, measured on the radially outer surface of the tread 2, not greater than 25 mm. Preferably, the substantially transverse grooves 208, 209, 210, 211 have a width, measured on the radially outer surface of the tread 2, not smaller than 6 mm. In the example shown in FIG. 2, the grooves 208, 209, 210, 211 have a width of about 17-19 mm (a width variation may be contemplated along the circumferential direction due to the variation of the circumferential extension of the pitch of the tyre 2).

Preferably, the substantially transverse grooves 208, 209, 210, 211 have a depth equal to at least 20 mm, more preferably to at least 22 mm.

Preferably, the substantially transverse grooves 208, 209 are inclined with respect to the axial direction by an angle with opposite sign with respect the angle formed by the substantially transverse grooves 210, 211. In this way, the whole of the substantially transverse grooves 208, 209, 210, 211 forms an "arrow" with tip pointing in the rolling direction of the tyre, indicated by R in FIG. 2.

Preferably, the substantially transverse grooves 208, 209 extend according to directions staggered in the circumferential direction.

Preferably, the substantially transverse grooves 210, 211 extend according to directions staggered in the circumferential direction.

The substantially longitudinal grooves 205 separate in the axial direction the circumferential row A of blocks 201 from the circumferential row B of blocks 202. Preferably, the substantially longitudinal grooves 205 are slightly inclined with respect to a direction parallel to the equatorial plane of the tyre. For example, they may form an angle between 0° and 30°, preferably between 0° and 25° with respect to a direction parallel to the equatorial plane. In the example shown in FIG. 2, the grooves 205 form an angle of about 13° with respect to a direction parallel to the equatorial plane of the tyre.

The substantially longitudinal grooves 206 separate in the axial direction the circumferential row B of blocks 202 from the circumferential row C of blocks 203. Preferably, the substantially longitudinal grooves 206 are slightly inclined with respect to a direction parallel to the equatorial plane of the tyre. For example, they may form an angle between 0° and 40°, preferably between 0° and 35° with respect to a direction parallel to the equatorial plane. In the example shown in FIG. 2, the grooves 206 form an angle of about 24° with respect to a direction parallel to the equatorial plane of the tyre.

The substantially longitudinal grooves 207 separate in the axial direction the circumferential row C of blocks 203 from the circumferential row D of blocks 204. Preferably, the substantially longitudinal grooves 207 are slightly inclined with respect to a direction parallel to the equatorial plane of the tyre. For example, they may form an angle between 0° and 30°, preferably between 0° and 25° with respect to a direction parallel to the equatorial plane. In the example shown in FIG. 2, the grooves 207 form an angle of about 13° with respect to a direction parallel to the equatorial plane of the tyre.

Preferably, the angle formed by the substantially longitudinal grooves 206 with respect to a direction parallel to the equatorial plane is greater than the angle formed by the substantially longitudinal grooves 205 with respect to a direction parallel to the equatorial plane.

Preferably, the angle formed by the substantially longitudinal grooves 206 with respect to a direction parallel to the equatorial plane is greater than the angle formed by the substantially longitudinal grooves 207 with respect to a direction parallel to the equatorial plane.

Preferably, the substantially longitudinal grooves 205, 206, 207 have a width, measured on the radially outer surface of the tread 2, not greater than about 25 mm, Preferably, the substantially longitudinal grooves 205, 206, 207 have a width, measured on the radially outer surface of the tread 2, not smaller than about 6 mm. In the example shown in FIG. 2, the grooves 205, 206, 207 have a width of about 7-8 mm.

Preferably, the substantially longitudinal grooves 205 are inclined with respect to a direction parallel to the equatorial plane by an angle with opposite sign with respect to the angle formed by the substantially longitudinal grooves 207.

Preferably, the substantially longitudinal grooves 206 alternate circumferentially their inclination with respect to a direction parallel to the equatorial plane, so as to form a zig-zagging groove extending between the circumferential rows B and C of blocks 202, 203.

Preferably, the substantially longitudinal grooves 205, 206, 207 have a maximum depth equal to the maximum depth of the substantially transverse grooves 208, 209, 210, 211.

In the preferred embodiment shown in FIGS. 2 and 3a, between the blocks 201, 202, 203, 204 so-called "ties", i.e. depth reductions in the substantially longitudinal grooves 208, 209, 210, 211, are provided. Such a solution allows the stiffness of the blocks 201, 202, 203, 204 in the axial direction to be increased.

Preferably, greater depth reductions are provided in the substantially longitudinal grooves 206 located in an axially innermost position compared to the depth reductions provided in the grooves 205, 207 located in an axially outermost position.

For example, in the substantially longitudinal grooves 205 between the blocks 201 and 202 depth reductions may be provided of about 15-30% with respect to the maximum depth of the substantially transverse grooves; in the substantially longitudinal grooves 207 between the blocks 203 and 204 depth reductions may be provided of about 15-30% with respect to the maximum depth of the substantially transverse grooves; in the substantially longitudinal grooves 206 between the blocks 202 and 203 depth reductions may be provided of about 30-50% with respect to the maximum depth of the substantially transverse grooves.

The substantially transverse grooves 208, 209, 210, 211 and the substantially longitudinal grooves 205, 206, 207 form with one another a plurality of intersections among the blocks 201, 202, 203, 204.

The plurality of intersections formed among the blocks comprise particularly broad intersections. For the sake of simplicity, only one of these broad intersections is indicated in FIG. 2 with reference numeral 212. In any case, similar broad intersections are clearly visible in FIG. 2 among other blocks, in corresponding and/or symmetrical positions with respect to the broad intersection indicated by 212.

The broad intersections 212 may be generated in different ways. For example, the may be generated due to particularly pronounced rounding radii and/or bevels of the blocks 201, 202, 203, 204 at the intersections. Additionally and/or alternatively, they may be generated due to the staggering of particularly wide grooves. Additionally and/or alternatively, they may be generated due to the intersection of grooves forming walls differently inclined with respect to one another in the surrounding blocks.

Each broad intersection 212 comprises a respective radially inner surface portion of the tread band 2 adapted to allow an ellipse 213 to be inscribed therein. The ellipse 213 may be drawn so as to be tangent to walls of the blocks 201, 202 (and/or 203, 204) at the radially inner surface of the tread band 2.

Such an ellipse 213 has a significant dimension (or area): the axes 214, 215 of the ellipse 213 have a length greater than the width both of the substantially transverse grooves 208, 209 and of the substantially longitudinal grooves 205 forming the broad intersection. For the purpose of comparison with the axes 214, 215 of the ellipse 213, the width of the substantially transverse grooves 208, 209 and of the substantially longitudinal grooves 205 (and, more generally, of all of the substantially transverse and substantially longitudinal grooves forming broad intersections 212) may be measured at the radially inner surface of the tread band 2.

More particularly, at least one of the axes 214, 215 of the ellipse 213 has length equal to at least 1.5 times the width of both the substantially transverse grooves 208, 209 and the substantially longitudinal grooves 205 forming the broad intersection 212. In other words, at least one of the axes 214, 215 of the ellipse 213 has a length greater than the maximum width of the grooves 208, 209, 205 which form—by intersecting one another—the broad intersection 212 itself. Referring to FIG. 2, the axis 214 has length clearly greater than 1.5 times the width of any of the grooves 208, 209 and 205 forming the broad intersection 212. More particularly, in the example shown in FIG. 2, the major axis 214 of the ellipse 213 has a length equal to about 35-36 mm, whereas the minor axis 215 of the ellipse 213 has a length equal to about 23-24 mm.

A protrusion 216, having a stocky shape, is arranged in each broad intersection 212. The protrusion 216 projects from the portion of radially inner surface of the tread band 2 corresponding to the broad intersection 212. The stocky shape, i.e. a shape with a width greater than the height, of the protrusion increases the lateral stiffness thereof.

The protrusion 216 has a volume smaller than the volume of the surrounding blocks 201, 202, 203, 204, nevertheless the volume should be selected so as to provide the protrusion 216 with a lateral stiffness greater than the lateral stiffness of the blocks surrounding the broad intersection. In this respect, solid shapes without thin portions or projections are preferred for the protrusion 216: in this respect, shapes with ragged lateral profiles, such as cross-like profiles or the like, are not preferred. This allows the protrusion 216 to be formed as a solid and stable piece, substantially stationary with respect to the walls of the blocks 201, 202, 203, 204 surrounding the broad intersection 212, when these blocks enter in and leave the footprint area during the rolling of the tyre.

In a preferred embodiment, the shape of the protrusion 216 is substantially frustoconical.

The protrusion 216 arranged in the broad intersections 212 projects from the radially inner surface of the tread band 2 by a height preferably smaller than the depth of the respective broad intersection 212 (i.e. of the depth of the tread band 2). This is shown in the section of FIG. 3a and in the enlarged view of FIG. 3b. The height of the protrusion may be, for example, between 25% and 75% of the depth of the respective broad intersection 212. In the example shown in FIG. 3b, the protrusion 216 has a height equal to about 29% of the depth of the broad intersection where it is located.

The height of the protrusion 216 smaller than the depth of the broad intersection 212 increases the lateral stiffness of the protrusion 216 itself. In this way, in fact, the protrusion 216 does come into contact with the ground when the broad intersection 212 passes in the footprint area, so as to remain stably bound to the belt structure underlying the tread band 2. It remains substantially stationary with respect to the movements of the walls of the surrounding blocks 201, 202, 203, 204.

The base surface 217 of the protrusion 216 preferably has a size at least equal to 40% of the length of the minor axis 215 of the ellipse 213 inscribable in the respective broad intersection 212. This allows occupying a large part of the portion of the radially inner surface of the tread band 2 comprised in the broad intersections 212 by means of the protrusion 216, as well as forming an extremely stable protrusion. Also in this case, for the purpose of a comparison between the dimension of the base surface of the protrusion 216 and the length of the minor axis 215 of the ellipse 213, the latter may be measured at the radially inner surface of the tread band 2. In the example shown in FIGS. 2, 3a, 3b, the base surface 217 of the protrusion 216 has a dimension (diameter) equal to about 12 mm. At the radially outer surface thereof, the protrusion 216 has a dimension (diameter) equal to about 8 mm.

Preferably, the outer profile of the base surface of the protrusion 216 is spaced apart from the walls of the blocks 201, 202, 203, 204 surrounding the respective broad intersection 212. This solution makes the walls of the blocks 201, 202, 203, 204 surrounding the broad intersection 212 independent from the protrusion 216, thus promoting the relative motion between the walls of the blocks 201, 202, 203, 204 and the protrusion 216.

In the preferred embodiment shown in FIGS. 2 and 4, the blocks 201, 202, 203, 204 surrounding the broad intersections 212 comprise an inclined leading wall 218. As it can be seen in the section of FIG. 4, such an inclined leading wall 218 may preferably comprise a plurality of steps. The walls of such steps may be rounded, so as to avoid the presence of corners which could cause the formation of cracks and/or breakings in the leading wall 218 of the block.

When the tyre 1 is set in rolling conditions on a muddy surface, a piece of mud may be trapped within the broad intersections 212 while the same pass in the footprint area. For example, the trapping of mud my occur due to a mutual approach movement in the lateral direction of the blocks 201, 202, 203 surrounding the broad intersections 212. Due to such movements in lateral direction of the blocks 201, 202, 203, 204, mud can get sucked in the broad intersections 212.

When each broad intersection 212 leaves the footprint area, a movement of mutual separation of the surrounding blocks 201, 202, 203, 204 takes place.

Such a separation movement, in combination with a thrust in radial direction caused by the protrusion 216 arranged in the broad intersection 212, promotes the expulsion of the piece of mud trapped in the broad intersection 212. Such a thrust is particularly effective due to the fact that the protrusion forms a solid and stiff piece substantially anchored to the belt structure 109.

Moreover the different lateral stiffness of the protrusion 216 and of the surrounding blocks 201, 202, 203, 204 causes a relative movement between the mobile walls of the blocks 201, 202, 203, 204 and the substantially fixed protrusion 216. This movement hinders the compaction of mud possibly trapped in the broad intersections 212 by causing fissuring, cracking and/or tearing of the trapped mud itself. This further contributes to promote the expulsion of trapped mud itself when leaving the footprint area.

The presence of steps in the walls, particularly in the leading walls 218, of the blocks 201, 202, 203, 204 surrounding the broad intersections 212 provides a ragged abutting surface for the mud trapped in the broad intersections 212 an possibly in the surrounding grooves 205, 206, 207. This may further promote the expulsion of trapped mud.

The tread 2 of the tyre 1 thus remains substantially always clean from mud which gets trapped while rolling, so as to maintain its traction features substantially the same on all of the grounds on which it runs. In particular, the broad intersections 212 provide the tyre 1 with a series of grip fronts when running a muddy ground, so as to improve its traction features on this kind of ground often difficult and slippery.

On the other side, the Applicant has surprisingly found that the presence of the above-mentioned broad intersections 212 do not cause any substantial increase of the noise level and/or of the vibrations generated by the tyre 1 when rolling on an asphalted ground.

The present invention has been described with reference to some embodiments thereof. Many modifications can be made in the embodiments described in detail, still remaining within the scope of protection of the invention, defined by the following claims.

The invention claimed is:

1. A tyre comprising a tread band, wherein said tread band comprises a plurality of blocks formed among a plurality of substantially transverse grooves and a plurality of substantially longitudinal grooves, said plurality of substantially longitudinal grooves comprising axially inner longitudinal grooves and axially outer longitudinal grooves, said axially inner longitudinal grooves having a greater angle with respect to a direction parallel to an equatorial plane than said axially outer longitudinal grooves, said plurality of blocks forming four circumferential rows of blocks spanning the width of the tread band, said substantially transverse and substantially longitudinal grooves further forming a plurality of intersections among said blocks, wherein said plurality of intersections comprises broad intersections, each broad intersection comprising a respective portion of a radially inner surface of said tread band having a significant dimension and being such as to allow an ellipse to be inscribed therein, said ellipse having axes longer than a width both of said substantially transverse grooves and of said substantially longitudinal grooves forming said broad intersection, at least one of said axes having a length equal to at least 1.5 times the width both of said substantially transverse grooves and of said substantially longitudinal grooves forming said broad intersection, wherein, in each broad intersection, a stocky-shaped protrusion is arranged, projecting from said portion of the radially inner surface of said tread band, said protrusion having a volume smaller than a volume of the blocks surrounding said broad intersection and such as to provide said protrusion with a lateral stiffness greater than a lateral stiffness of said surrounding blocks, and wherein each respective broad intersection is formed by a pair of substantially transverse grooves staggered in a substantially transverse direction and a pair of substantially longitudinal grooves staggered in a substantially longitudinal direction.

2. The tyre according claim 1, wherein said broad intersections are formed between at least one pair of adjacent circumferential rows of blocks, comprising transverse grooves staggered in a transverse direction.

3. The tyre according to claim 2, wherein said broad intersections are formed between at least two pairs of adjacent circumferential rows of blocks, each pair of circumferential rows having transverse grooves staggered in the transverse direction.

4. The tyre according to claim 1, wherein said four circumferential rows of blocks divide a width of said tread band into four respective portions with substantially the same width.

5. The tyre according to claim 1, wherein said stocky-shaped protrusion projects from said radially inner surface of said tread band by a height smaller than a depth of said broad intersection.

6. The tyre according to claim 5, wherein said height is between 25% and 75% of the depth of said broad intersection.

7. The tyre according to claim 1, wherein a base surface of said stocky-shaped protrusion has a size at least equal to 40% of a length of a minor axis of the ellipse inscribable in said broad intersection.

8. The tyre according claim 1, wherein said protrusion has a frustoconical shape.

9. The tyre according to claim 1, wherein a profile of a base surface of said stocky-shaped protrusion is spaced apart from walls of said blocks surrounding said broad intersection.

10. The tyre according to claim 1, wherein at least said blocks surrounding said broad intersection comprise an inclined leading wall.

11. The tyre according to claim 10, wherein said inclined leading wall comprises at least one step.

12. A method for promoting traction of a tyre on a muddy surface, said tyre comprising a tread band, said tread band comprising a plurality of blocks formed among a plurality of substantially transverse grooves and a plurality of substantially longitudinal grooves, said plurality of substantially longitudinal grooves comprising axially inner longitudinal grooves and axially outer longitudinal grooves, said axially inner longitudinal grooves having a greater angle with respect to a direction parallel to an equatorial plane than said axially outer longitudinal grooves, said plurality of blocks forming four circumferential rows of blocks spanning the width of the tread band, said substantially transverse and substantially longitudinal grooves further forming a plurality of intersections among said blocks, comprising:

a) forming at least one broad intersection comprising a respective portion of a radially inner surface of said tread band having a significant dimension and being such as to allow an ellipse to be inscribed therein, said ellipse having axes longer than a width both of said substantially transverse grooves and of said substantially longitudinal grooves forming said broad intersection, at least one of said axes having a length equal to at least 1.5 times the width both of said substantially transverse grooves and of said substantially longitudinal grooves forming said broad intersection, wherein said broad intersection is formed by a pair of substantially transverse grooves staggered in a substantially transverse direction and a pair of substantially longitudinal grooves staggered in a substantially longitudinal direction;

b) arranging in said broad intersection, a stocky-shaped protrusion projecting from said radially inner surface of said tread band, said stocky-shaped protrusion having a volume smaller than a volume of the blocks surrounding said broad intersection and such as to provide said protrusion with a lateral stiffness greater than a lateral stiffness of said surrounding blocks;

c) setting said tyre in rolling condition on said muddy surface;

d) trapping a piece of mud within said broad intersection while said broad intersection passes in a footprint area, by means of a first movement of mutual approach of the blocks surrounding said broad intersection; and e) promoting the expulsion of said piece of mud from said broad intersection after said broad intersection has left the footprint area, by means of a second movement of mutual separation of the blocks surrounding said broad intersection in combination with a thrust in a radial direction caused by the stocky-shaped protrusion arranged in said broad intersection.

13. The method according to claim 12, further comprising:

f) hindering compaction of a trapped piece of mud within said broad intersection by means of a third mutual movement among said blocks surrounding said broad intersection while said broad intersection passes in the footprint area.

\* \* \* \* \*